United States Patent
Woody et al.

(10) Patent No.: US 11,608,913 B2
(45) Date of Patent: Mar. 21, 2023

(54) PIPE SUPPORT ASSEMBLY WITH LOCKABLE PIPE SHIELD

(71) Applicant: ASC Engineered Solutions, LLC, Exeter, NH (US)

(72) Inventors: Rhett Douglas Larry Woody, Jackson, TN (US); Stephen Eric Scott, North Kingstown, RI (US); Michael T. Thornley, II, Johnston, RI (US); Colin Edward Parkhurst, Coventry, RI (US)

(73) Assignee: ASC Engineered Solutions, LLC, Portsmouth, NH (US)

(*) Notice: Subject to any disclaimer, the term of this patent is extended or adjusted under 35 U.S.C. 154(b) by 0 days.

(21) Appl. No.: 17/332,588

(22) Filed: May 27, 2021

(65) Prior Publication Data

US 2022/0381370 A1 Dec. 1, 2022

(51) Int. Cl.
*F16L 3/10* (2006.01)
*F16L 3/11* (2006.01)
*A62C 35/68* (2006.01)

(52) U.S. Cl.
CPC ............. *F16L 3/1091* (2013.01); *F16L 3/11* (2013.01); *A62C 35/68* (2013.01)

(58) Field of Classification Search
CPC ......... F16L 3/1091; F16L 3/11; F16L 3/1008; F16L 59/135; F16L 3/26; F16L 3/14; A62C 35/68; H02G 3/263; H02G 7/10; Y10T 29/49
See application file for complete search history.

(56) References Cited

U.S. PATENT DOCUMENTS

| | | | |
|---|---|---|---|
| 1,789,997 A * | 1/1931 | Blackburn | H02G 7/10 248/61 |
| 3,212,741 A | 10/1965 | Ericson | |
| 3,653,618 A | 4/1972 | Kindorf et al. | |
| 5,511,609 A | 4/1996 | Tyler | |
| 6,283,158 B1 * | 9/2001 | Botsolas | F16L 35/00 285/58 |
| D473,128 S | 4/2003 | Costa | |
| 6,582,655 B2 * | 6/2003 | Botsolas | F16L 59/135 134/28 |

(Continued)

OTHER PUBLICATIONS

Anvil international pipe hanger catalog Jul. 2009 https://www.paramountsupply.com/products_docs/anvil/Pipe_Hanger_Catalog.pdf (Year: 2009).*

(Continued)

*Primary Examiner* — Terrell L McKinnon
*Assistant Examiner* — Ding Y Tan
(74) *Attorney, Agent, or Firm* — Taylor English Duma LLP

(57) ABSTRACT

Disclosed is a lockable pipe shield for a pipe support assembly, a pipe support assembly, and a method of securing a lockable pipe shield to a pipe hanger. Example aspects of the lockable pipe shield for a pipe support assembly can comprise a substantially semi-cylindrical shield body defining a first shield end, a second shield end opposite the first shield end, and an upper shield edge; and a lock tab coupled to the shield body at the upper shield edge, the lock tab bendable relative to the shield body between a first position and a second position, wherein, in the first position, the lockable pipe shield is in an unlocked configuration, and in the second position, the lockable pipe shield is in a locked configuration.

28 Claims, 4 Drawing Sheets

(56) References Cited

U.S. PATENT DOCUMENTS

| | | | |
|---|---|---|---|
| 6,691,742 B1 | 2/2004 | Cooper | |
| 8,038,105 B2 | 10/2011 | Deichman | |
| 8,840,071 B2 * | 9/2014 | Oh | F16L 3/1075 |
| | | | 248/65 |
| 8,915,110 B1 * | 12/2014 | Moore | F16L 3/14 |
| | | | 72/131 |
| 8,919,704 B2 * | 12/2014 | Lee | H02G 3/263 |
| | | | 248/62 |
| 2014/0175230 A1 * | 6/2014 | Lee | H02G 3/263 |
| | | | 248/62 |
| 2014/0312182 A1 | 10/2014 | Nijdam et al. | |
| 2016/0208979 A1 * | 7/2016 | Lange | F16L 59/135 |
| 2020/0271241 A1 * | 8/2020 | Juzak | F16L 3/24 |
| 2021/0278027 A1 * | 9/2021 | Schmitt | F16L 59/135 |

OTHER PUBLICATIONS

Eaton B-line series "Pipe Hangers & Supports" Oct. 2019 catalog (Year: 2019).*

EATON; Article entitled: "Insulation protection shields", accessed on Jan. 7, 2021, located at <https://www.eaton.com/us/en-us/catalog/support-systems/insulation-protection-shields.html>, 6 pgs.

* cited by examiner

PIPE SUPPORT ASSEMBLY WITH LOCKABLE PIPE SHIELD

TECHNICAL FIELD

This disclosure relates to hanging pipes. More specifically, this disclosure relates to a pipe support assembly with a lockable pipe shield.

BACKGROUND

Pipes, such as water pipes in a building for sprinkler systems or residential or commercial water use, can be suspended from ceilings by pipe support assemblies. The pipes are sometimes sheathed in insulation to maintain certain temperatures of fluid within the pipe, such as hot or cold water lines or environments where temperatures can risk freezing fluid within the pipe. Pipe support assemblies typically comprise a hanger, such as a clevis hanger, and can comprise include a pipe insulation shield cradled by the hanger and supporting the insulation and the pipe. The pipe insulation shield also serves to distribute the load on the hanger so that the weight of the pipe does not crush the insulation, which is often fiberglass or similar compressible materials, at the hanger. The pipe shield can slip on the hanger, particularly during expansion and/or contraction cycles or when subjected to vibrations, such as vibrations due to seismic events or everyday vibrations from foot traffic, machine vibrations, or vibrations from fluid flow and water hammer in the pipes themselves. Some pipe shield comprise restraint features at the bottom of the pipe shield intended to reduce slipping. However, the bottom of the pipe shield is load-bearing and the restraint features can damage the insulation and/or the pipe supported thereon.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a lockable pipe shield for a pipe support assembly, the lockable pipe shield comprising a substantially semi-cylindrical shield body defining a first shield end, a second shield end opposite the first shield end, and an upper shield edge; and a lock tab coupled to the shield body at the upper shield edge, the lock tab bendable relative to the shield body between a first position and a second position, wherein, in the first position, the lockable pipe shield is in an unlocked configuration, and in the second position, the lockable pipe shield is in a locked configuration.

Also disclosed is a pipe support assembly comprising a pipe hanger defining a lower hanger end and a hanger arm, the hanger arm defining a side edge; and a lockable pipe shield comprising a shield body and a lock tab, the shield body supported on the lower hanger end of the pipe hanger, the lock tab bendable around the side edge of the hanger arm to secure the lockable pipe shield to the pipe hanger.

A method of securing a lockable pipe shield to a pipe hanger is disclosed, the method comprising supporting a lower shield end of the lockable pipe shield on a lower hanger end of the pipe hanger, the pipe hanger comprising a hanger arm defining a first side edge and a second side edge; bending a first lock tab of the lockable pipe shield around the first side edge of the hanger arm, the lockable pipe shield defining an upper shield end distal to the lower shield end, the first lock tab adjacent to the upper shield end; and bending a second lock tab of the lockable pipe shield around the second side edge of the hanger arm towards the first lock tab, the second lock tab adjacent to the upper shield end.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
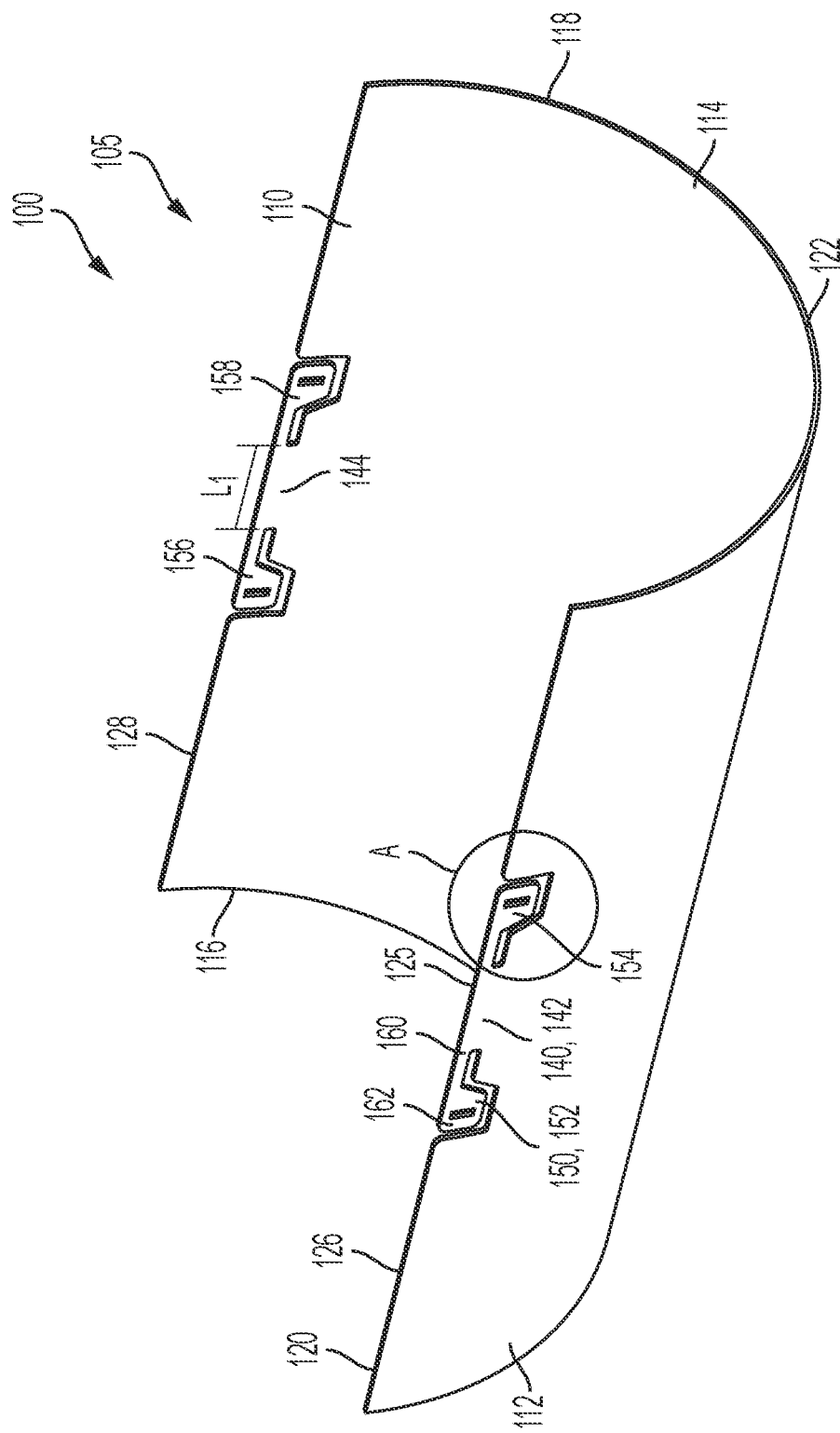
FIG. 1 is a perspective view of a lockable pipe shield according to one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

The use of the directional terms herein, such as right, left, front, rear, back, top, bottom, and the like can refer to the orientation shown and described in the corresponding figures, but these directional terms should not be considered limiting on the orientation or configuration required by the present disclosure. The use of ordinal terms herein, such as first, second, third, fourth, and the like can refer to elements associated with elements having matching ordinal numbers.

Disclosed is a pipe support assembly and associated methods, systems, devices, and various apparatus. Example aspects of the pipe support assembly can comprise a pipe hanger and lockable pipe shield. It would be understood by one of skill in the art that the pipe support assembly is described in but a few exemplary embodiments among many. No particular terminology or description should be considered limiting on the disclosure or the scope of any claims issuing therefrom.

FIG. 1 is a perspective view of a lockable pipe shield 100, in accordance with one aspect of the present disclosure. In example aspects, the lockable pipe shield 100 can be a lockable pipe insulation shield 105, as described in further detail below with respect to FIG. 6. According to example aspects, the lockable pipe shield 100 can be substantially semi-cylindrical in shape or otherwise curved or shaped to match a curve of a pipe 610 (shown in FIG. 6) and insulation 620 (shown in FIG. 6). For example, the lockable pipe shield 100 can comprise a shield body 110 defining a substantially semi-cylindrical outer shield surface 112 and a substantially semi-cylindrical inner shield surface 114 opposite the outer shield surface 112. The shield body 110 can define a first shield end, such as a left shield end 116, and a second shield end opposite the first shield end, such as a right shield end 118, relative to the orientation shown. The shield body 110 can further define an upper shield end 120 and a lower shield end 122 opposite the upper shield end 120, relative to the orientation shown. A center 125 of the lockable pipe shield 100 can be defined between the left shield end 116 and the right shield end 118. Moreover, the shield body 110 can define one or more upper shield edges, such as a first upper shield edge (e.g., a front upper shield edge 126, relative to the orientation shown) and a second upper shield edge (e.g., a rear upper shield edge 128, relative to the orientation shown). Each of the front upper shield edge 126 and rear upper shield edge 128 can be defined at the upper shield end 120 and can extend along a length of the lockable pipe shield 100 between the left and right shield ends 116,118.

Example aspects of the lockable pipe shield 100 can be formed from a metal material, such as, for example and without limitation, carbon steel, which can be bent to define the semi-cylindrical shape. Additionally, in some aspects the lockable pipe shield 100 can comprise a coating or finish of a pre-galvanized material. Other aspects of the lockable pipe shield 100 can be formed from any other suitable material known in the art, including but not limited to, other metals, plastics, composites, and the like. Furthermore, other aspects of the lockable pipe shield 100 may or may not comprise the finish.

According to example aspect aspects, the lockable pipe shield 100 can further comprise one or more lock tabs 150 coupled to and movable relative to the shield body 110. For example, the lock tabs 150 can be bendable relative to the shield body 110 between a first position, as shown, and a second position, shown in FIG. 5. The lock tabs 150 can be configured to selectively lock the lockable pipe shield 100 to a pipe hanger 410 (shown in FIG. 4), as described in further detail below. In the present aspect, the lockable pipe shield 100 can comprise four of the lock tabs 150. For example, as shown, the lock tabs 150 can comprise first and second front lock tabs 152,154 formed at or adjacent to the front upper shield edge 126 and first and second rear lock tabs 156,158 formed at or adjacent to the rear upper shield edge 128. In the present aspect, the front upper shield edge 126 can define an upper boundary of each of the first and second front lock tabs 152,154, and the rear upper shield edge 128 can define an upper boundary of each of the first and second rear lock tabs 156,158, relative to the orientation shown. In other aspects, the front upper shield edge 126 and rear upper shield edge 128 may not define the upper boundaries of the lock tabs 150. Additionally, in other aspects, the lockable pipe shield 100 may comprise more or fewer lock tabs 150. For example, other aspects can comprise the first and second front lock tabs 152,154 only or the first and second rear lock tabs 156,158 only. Other aspects can comprise the first front lock tab 152 and the second rear lock tab 158 only, or the second front lock tab 154 and the first rear lock tab 156 only. In example aspects, the lock tabs 150 can be monolithically formed (i.e., formed as a singular component that constitutes a single material without joints or seams) with the shield body 110 of the lockable pipe shield 100. In other aspects, the lock tabs 150 can be separately formed from the shield body 110 and attached thereto, such as by fasteners or welding. The lock tabs 150 can formed by stamping, punching, or laser cutting, for example. In other aspects, the lock tabs 150 can be formed by any other suitable manufacturing process.

According to example aspects, a tab spacing 140 can be defined between the first and second front lock tabs 152,154 and between the first and second rear lock tabs 156,158. For example, the tab spacings 140 can comprise a front lock tab spacing 142 defined between the first and second front lock tabs 152,154 and a rear lock tab spacing 144 defined between the first and second rear lock tabs 156,158. Thus, the first front lock tab 152 can be spaced from the second front lock tab 154, and the first rear lock tab 156 can be spaced from the second rear lock tab 158. In example aspects, each of the lock tabs 150 can be configured to bend relative to the shield body 110 towards the corresponding tab spacing 140. Each of the front and rear lock tab spacings 142,144 can define a length $L_1$, as shown, and can be configured to be laterally aligned with corresponding front and rear hanger arms 454,456 (shown in FIG. 4) of the pipe hanger 410, as described in further detail below. According to example aspects, the length $L_1$ of the front and rear lock tab spacings 142,144 can be about equal to or slightly greater than a length $L_2$ (shown in FIG. 4) of the front and rear hanger arms 454,456. In other aspects, the length $L_1$ can be greater or less than the length $L_2$, as desired. In example aspects, each of the tab spacings 140 can be monolithically formed with the shield body 110.

Referring to the first and second front lock tabs 152,154, which can also exemplify the first and second rear lock tabs 156,158, the first front lock tab 152 can be defined between the left shield end 116 and the center 125 of the lockable pipe shield 100, and the second front lock tab 154 can be defined between the right shield end 118 and the center 125 of the lockable pipe shield 100. The first front lock tab 152 and the second front lock tab 154 can be spaced apart by the front lock tab spacing 142. The front lock tab spacing 142 can be defined substantially at the center 125 of the lockable pipe shield 100. As shown, each of the first and second front lock tabs 152,154 can define an inner end 160 adjacent to the front lock tab spacing 142 and an outer end 162 opposite the inner end 160. The first front lock tab 152 can extend from the corresponding inner end 160 to the corresponding outer end 162 in the direction of the left shield end 116, and the second front lock tab 154 can extend from the corresponding inner end 160 to the corresponding outer end 162 in the direction of the right shield end 118. According to example aspects, each of the first and second front lock tabs 152,154 can be configured to bend relative to the front lock tab spacing 142 at or near the inner end 160 thereof to wrap around the front hanger arm 454 of the pipe hanger 410 and secure the lockable pipe shield 100 thereto. In example aspects, the first and second rear lock tabs 156,158 can be formed substantially the same as the first and second front lock tabs 152,154 and can be configured to wrap around the rear hanger arm 456 of the pipe hanger 410.

Figure 2:
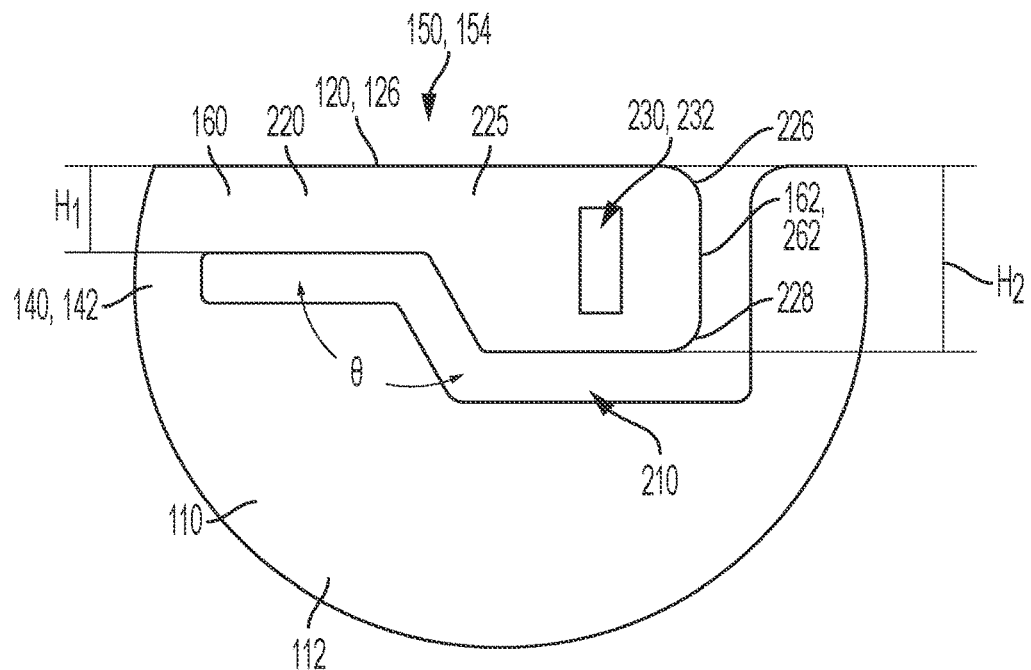
FIG. 2 is a close-up view of a lock tab of the lockable pipe shield of FIG. 1, taken from Detail A of FIG. 1.

FIG. 2 illustrates a close up view of one of the lock tabs 150, taken from Detail A of FIG. 1. Specifically, the second front lock tab 154 is shown, which can exemplify all of the lock tabs 150. As shown, the front upper shield edge 126 can define the upper boundary of the second front lock tab 154. The front upper shield edge 126 can also define an upper boundary of the adjacent front lock tab spacing 142. According to example aspects, the lock tab 150 can further be defined by a cut 210 formed in the lockable pipe shield 100. The cut 210 can be formed by stamping, punching, laser cutting, or any other suitable manufacturing method. As shown, the cut 210 can define the outer end 162 of the lock tab 150, as well as a lower boundary of the lock tab 150, relative to the orientation shown. Thus, the outer end 162 of the lock tab 150 can be a free outer end 262, and the inner end 160 of the lock tab 150 can be coupled to the corresponding tab spacing 140 opposite the free outer end 262. In example aspects, the lock tab 150 can generally define a hinge portion 220 at or adjacent to the inner end 160 and a tab portion 225 at or adjacent to the outer end 162. The tab portion 225 can be connected to the hinge portion 220 distal to the tab spacing 140, as shown.

In example aspects, the hinge portion 220 can define a height $H_1$ that can be less than a height $H_2$ of the tab portion 225. The lesser height $H_1$ of the hinge portion 220 can localize the bending of the lock tab 150 at the hinge portion 220. The lesser height $H_1$ of the hinge portion 220 can further allow the lock tab 150 to be easily bent relative to the corresponding tab spacing 140 and the shield body 110 with minimal force, as described in further detail below. Additionally, the greater height $H_2$ of the tab portion 225 can provide a larger surface area for applying the force to bend the lock tab 150 at the hinge portion 220. For example, in some aspects, a user can push against the tab portion 225 of the lock tab 150 with a thumb or other finger(s) or with a tool to bend the lock tab 150 at the hinge portion 220. The tool can be, for example and without limitation, a screwdriver, pliers, hammer, or any other suitable tool known in the art. Additionally, some example aspects of the lock tab 150 can define a tab opening 230 formed through the tab portion 225, which in the present aspect can be a punch-out 232 formed by punching. The tab opening 230 can define a rectangular slot, as shown, or can define any other suitable shape. In other aspects, the tab opening 230 can be formed by any other suitable manufacturing method known in the art. The tab opening 230 can allow a tool, such as a flat-head screwdriver, to be engaged therewith for pushing or pulling the tab portion 225 in order to bend the lock tab 150 at the hinge portion 220.

As shown, some example aspects of the lock tab 150 can define an obtuse angle θ between the hinge portion 220 and the tab portion 225 at the lower boundary of the lock tab 150. For example, the angle θ can be about 120° in the present aspect. In other aspects, the angle θ can be greater or lesser than 120°. In other aspects, the angle θ may not be obtuse. For example, the angle θ can be about a right angle. Moreover, according to some example aspects, as shown, the various angles and corners defined by the cut 210 and/or the lock tab 150 can be rounded eliminate sharp areas. For example, an upper corner 226 and a lower corner 228 of the tab portion 225 can be rounded so that a user can manually push or pull against the tab portion 225 without poking or nicking their hand.

Figure 3:
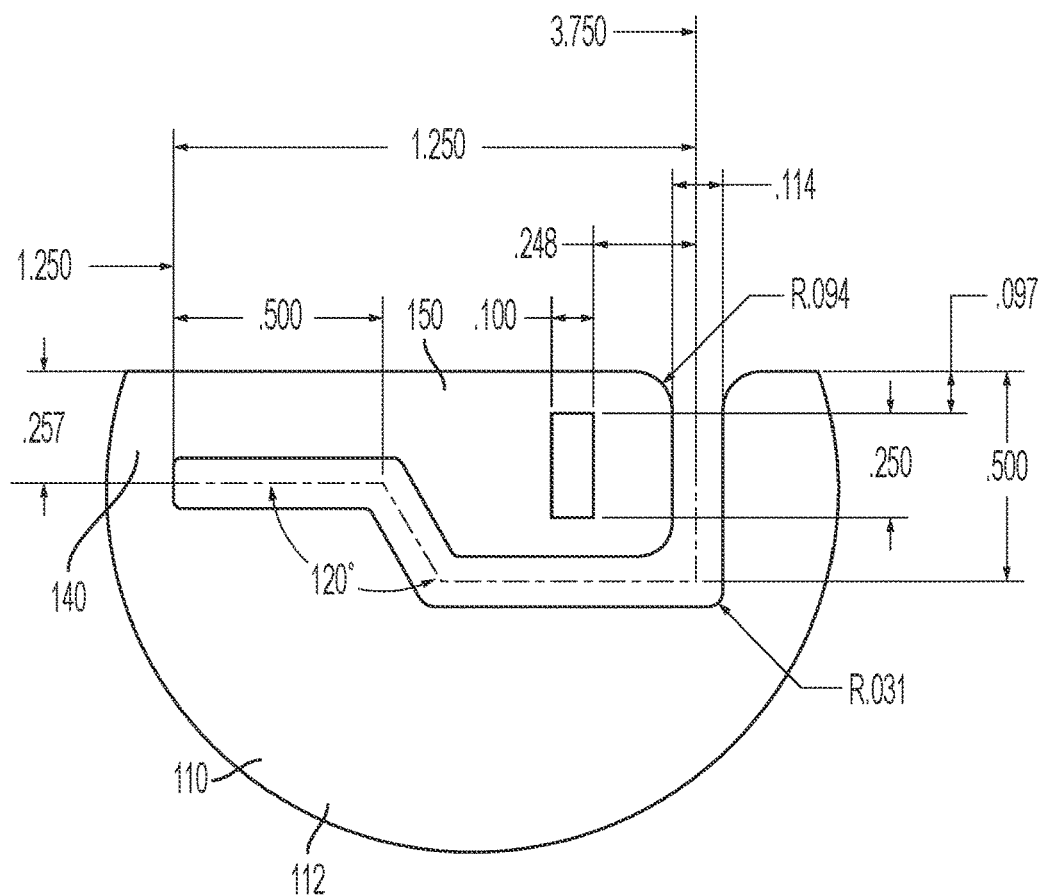
FIG. 3 is a close-up view of the lock tab of FIG. 2, taken from Detail A of FIG. 1, illustrating example dimensions thereof.

FIG. 3 illustrates various example dimensions of one of the lock tabs 150 in inches, according to an example aspect of the present disclosure. The dimensions disclosed herein are merely possible examples and should not be construed as limiting.

Figure 4:
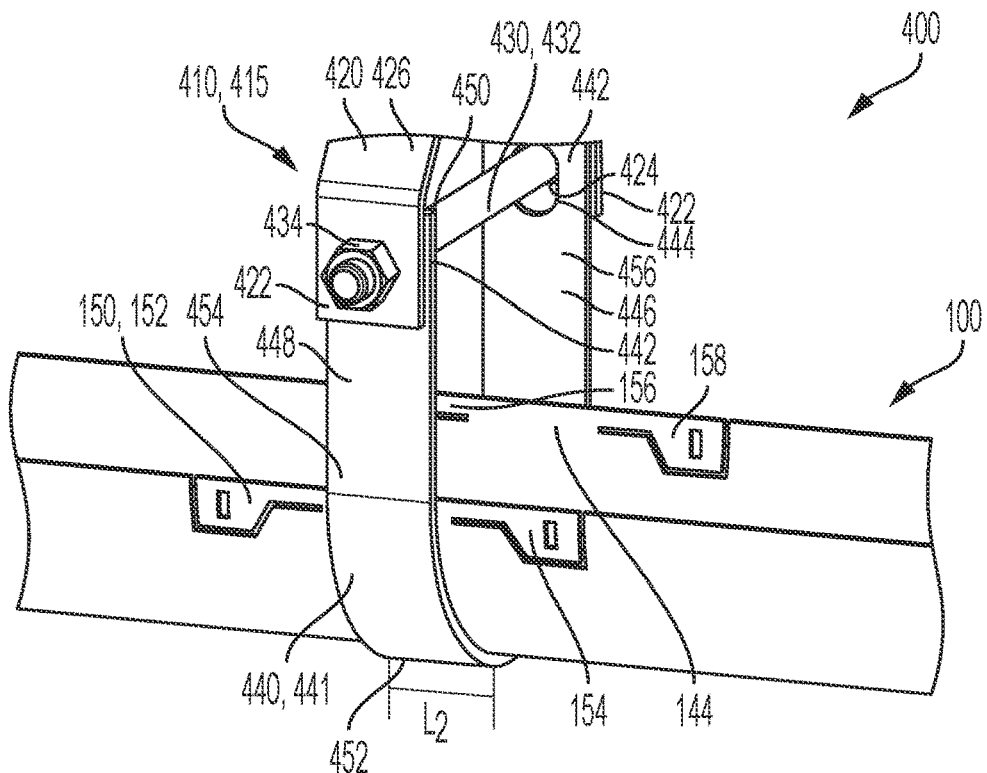
FIG. 4 is a perspective view of the lockable pipe shield of FIG. 1 assembled with a pipe hanger and in an unlocked configuration, in accordance with another aspect of the present disclosure, wherein the lockable pipe shield and the pipe hanger together define a pipe support assembly.

FIG. 4 illustrates a pipe support assembly 400 according to another example aspect of the present disclosure. The pipe support assembly 400 can comprise the pipe hanger 410 and the lockable pipe shield 100. In example aspects, the pipe hanger 410 can be a clevis hanger 415, as shown. In other aspects, however, the pipe hanger 410 can be any other suitable pipe hanger 410 known in the art, such as a trapeze hanger or J-hanger. According to example aspects, the pipe hanger 410 can be suspended from a ceiling of a structure to support a pipe 610 (shown in FIG. 6) above a ground surface. The pipe hanger 410 of the present aspect can comprise an upper hanger member 420 and a lower hanger member 440. In example aspects, a support rod (not shown) or other support member can engage the upper hanger member 420 and can suspend the pipe hanger 410 from the ceiling. The lower hanger member 440 can be a substantially U-shaped strap 441 and can be configured to cradle the lockable pipe shield 100, as shown.

The upper hanger member 420 can be fastened to the lower hanger member 440 by a hanger fastener 430 such as, for example, a bolt 432 and a pair of nuts 434. In other aspects, the hanger fastener 430 can comprise any other suitable fastener(s) known in the art. As shown, the upper hanger member 420 can define a pair of upper free ends 422 and the lower hanger member 440 can define a pair of lower free ends 442. Each of the upper free ends 422 can define an upper fastener hole 424 therethrough, and each of the lower free ends 442 can define a lower fastener hole 444 therethrough. Each of the upper fastener holes 424 can be aligned with a corresponding one of the lower fastener holes 444, and the bolt 432 can extend through each of the upper fastener holes 424 and lower fastener holes 444. The nuts 434 can be disposed on opposing sides of the bolt 432 and can be tightened against an outer surface 426 of the upper hanger member 420 proximate to the upper free ends 422 thereof. In other aspects, the upper hanger member 420 can be monolithically formed with the lower hanger member 440.

According to example aspects, the upper hanger member 420 and lower hanger member 440 can be formed from a metal material, such as, for example and without limitation, carbon steel. In some aspects, the upper hanger member 420 and/or lower hanger member 440 can comprise a coating or finish of a pre-galvanized material, such as, for example. Other aspects of the upper hanger member 420 and/or lower hanger member 440 can be formed from any other suitable material known in the art, including but not limited to, other metals, plastics, composites, and the like. Furthermore, other aspects of the upper hanger member 420 and/or lower hanger member 440 may or may not comprise the finish.

The lower hanger member 440 can comprise at least one hanger arm. For example, the U-shaped lower hanger member 440 of the present aspect can comprise the front hanger arm 454 and the rear hanger arm 456 opposite the front hanger arm 454. The front hanger arm 454 and rear hanger arm 456 can each define one of the lower free ends 442. Example aspects of the lower hanger member 440 can further define an inner hanger surface 446, an outer hanger surface 448 opposite the inner surface 446, an upper hanger end 450, and a lower hanger end 452 opposite the upper hanger end 450. As shown, the lockable pipe shield 100 can be cradled by the lower hanger member 440, with the lower shield end 122 of the lockable pipe shield 100 supported on the lower hanger end 452 of the lower hanger member 440 and the outer shield surface 112 confronting the inner hanger surface 446. According to example aspects, the front lock tab spacing 142 (shown in FIG. 1) of the lockable pipe shield 100 can be laterally aligned with front hanger arm 454 of the lower hanger member 440, and similarly, the rear lock tab spacing 144 can be laterally aligned with the rear hanger arm 456. As such, the first and second front lock tabs 152,154 can be oriented on either side of the front hanger arm 454, and the first and second rear lock tabs 156,158 can be oriented on either side of the rear hanger arm 456.

Figure 5:
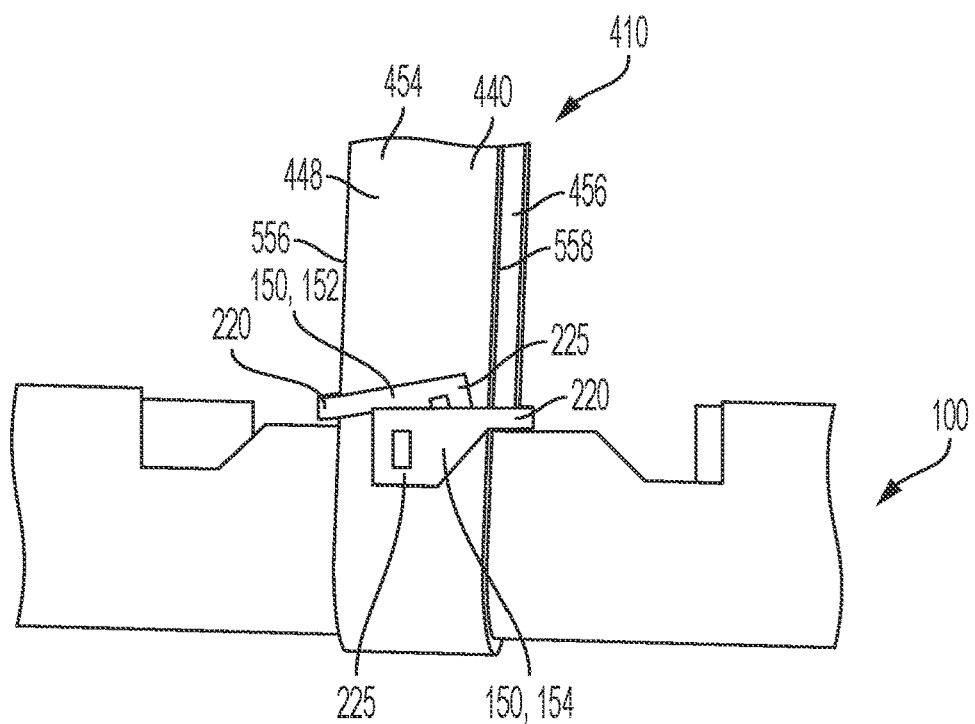
FIG. 5 is a front view of pipe support assembly of FIG. 4 with the lockable pipe shield in a locked configuration.

According to example aspects, the lockable pipe shield 100 can be configurable in an unlocked configuration, as shown, wherein the lock tabs 150 are in the first position, and a locked configuration, as shown in FIG. 5, wherein the lock tabs 150 are in the second position. In the unlocked configuration, the lockable pipe shield 100 is not secured to the pipe hanger 410 and can be movable relative to the pipe hanger 410. For example, the lockable pipe shield 100 can slide laterally relative to the pipe hanger 410 and longitudinally relative to the pipe 610 in the unlocked configuration. In the locked configuration, however, the lockable pipe shield 100 can be secured to the pipe hanger 410 and lateral movement of the lockable pipe shield 100 relative to the pipe hanger 410 can be prevented.

Referring to FIG. 5, to orient the lockable pipe shield 100 in the locked configuration from the unlocked configuration, the lock tabs 150 of the lockable pipe shield 100 can be folded around the lower hanger member 440. For example, the first front lock tab 152 can be bent at the corresponding hinge portion 220 to fold the first front lock tab 152 around a first side edge 556 the front hanger arm 454 of the lower hanger member 440. The first front lock tab 152 can be manually folded by a user or can be folded using a tool, as described above. Once folded, the tab portion 225 of the first front lock tab 152 can substantially confront the outer hanger surface 448 of the lower hanger member 440. Similarly, the second front lock tab 154 can be bent at the corresponding hinge portion 220 to fold the second front lock tab 154 around a second side edge 558 of the front hanger arm 454, which can be oriented substantially opposite the first side edge 556. The second front lock tab 154 can be manually folded by the user or can be folded using a tool. Once folded, the tab portion 225 of the second front lock tab 154 can substantially confront the tab portion 225 of the first front lock tab 152. In other aspects, the second front lock tab 154 can be folded prior to folding the first front lock tab 152. Folding the first and second front lock tabs 152,154 folded around the corresponding first and second side edges 556, 558 can secure the lockable pipe shield 100 to the front hanger arm 454 of the pipe hanger 410, preventing lateral movement of lockable pipe shield 100 relative to the pipe hanger 410. The first and second rear lock tabs 156,158 (shown in FIG. 1) can be similarly folded around the rear hanger arm 456 of the pipe hanger 410 to secure the lockable pipe shield 100 to the rear hanger arm 456. According to example aspects, a length of each of the hinge portions 220 of the lock tabs 150 can be configured to allow the lock tabs 150 to fully wrap around the corresponding first and second side edges 556,558 of the front and rear hanger arms 454,456 and, in some aspects, overlap each other.

As mentioned above, other aspects of the lockable pipe shield 100 can comprise the first and second front lock tabs 152,154 only, or the first and second rear lock tabs 156,158 only, which can be sufficient to prevent lateral movement of the lockable pipe shield 100 relative to the pipe hanger 410 in some environments. Additionally, other aspects of the lockable pipe shield 100 can comprise the first front lock tab 152 and second rear lock tab 158 only, wherein lateral movement of the lockable pipe shield 100 in a first direction can be prevented by the first front lock tab 152, and lateral movement of the lockable pipe shield 100 in an opposite second direction can be prevented by the second rear lock tab 158. Similarly, in other aspects, the lockable pipe shield 100 can comprise the second front lock tab 154 and the first rear lock tab 156 only.

Thus, a method of securing the lockable pipe shield 100 to the pipe hanger 410 can comprise supporting the lower shield end 122 of the lockable pipe shield 100 on the lower hanger end 452 of the pipe hanger 410. The pipe hanger 410 can comprise the front hanger arm 454 defining the first side edge 556 and the second side edge 558. The method can further comprise bending the first front lock tab 152 of the lockable pipe shield 100 around the first side edge 556 of the front hanger arm 454, wherein the lockable pipe shield 100 can define the upper shield end 120 distal to the lower shield end 122 and the first front lock tab 152 can be adjacent to the upper shield end 120. The method can further comprise bending the second front lock tab 154 of the lockable pipe shield 100 around the second side edge 558 of the front hanger arm 454 towards the first front lock tab 152, wherein the second front lock tab 154 can also be adjacent to the upper shield end 120. In example aspects, the method can further comprise the steps of installing the insulation 620 (shown in FIG. 6) with the lockable pipe shield 100 and installing the pipe 610 (shown in FIG. 6) with the lockable pipe shield 100. In some aspects, the insulation 620 can be pre-assembled with the pipe 610 to define an insulated pipe 630, and method can comprise installing the insulated pipe 630 with the lockable pipe shield 100.

In some aspects, bending the first front lock tab 152 around the first side edge 556 of the front hanger arm 454 can comprise bending the corresponding hinge portion 220 around the first side edge 556 and disposing the corresponding tab portion 225 in confrontation with the outer hanger surface 448 at the front hanger arm 454. Furthermore, bending the second front lock tab 154 around the second side edge 558 of the front hanger arm 454 can comprise bending the corresponding hinge portion 220 around the second side edge 558 and disposing the corresponding tab portion 225 in confrontation with the tab portion 225 of the first front lock tab 152. In some aspects, bending the first front lock tab 152 can further comprise engaging the tab opening 230 of the corresponding tab portion 225 with a tool and pushing or pulling the tab portion 225 of the first front lock tab 152 with the tool. Similarly, bending the second front lock tab 154 can further comprise engaging the tab opening 230 of the corresponding tab portion 225 with the tool and pushing or pulling the tab portion 225 of the second front lock tab 154 with the tool. In some aspects, the pipe hanger 410 can further comprise the rear hanger arm 456, which can also define the corresponding first side edge 556 and the corresponding second side edge 558, and the method can further comprise bending the first rear lock tab 156 around the first side edge 556 of the rear hanger arm 456 and bending the second rear lock tab 158 around the second side edge 558 of the rear hanger arm 456.

Figure 6:
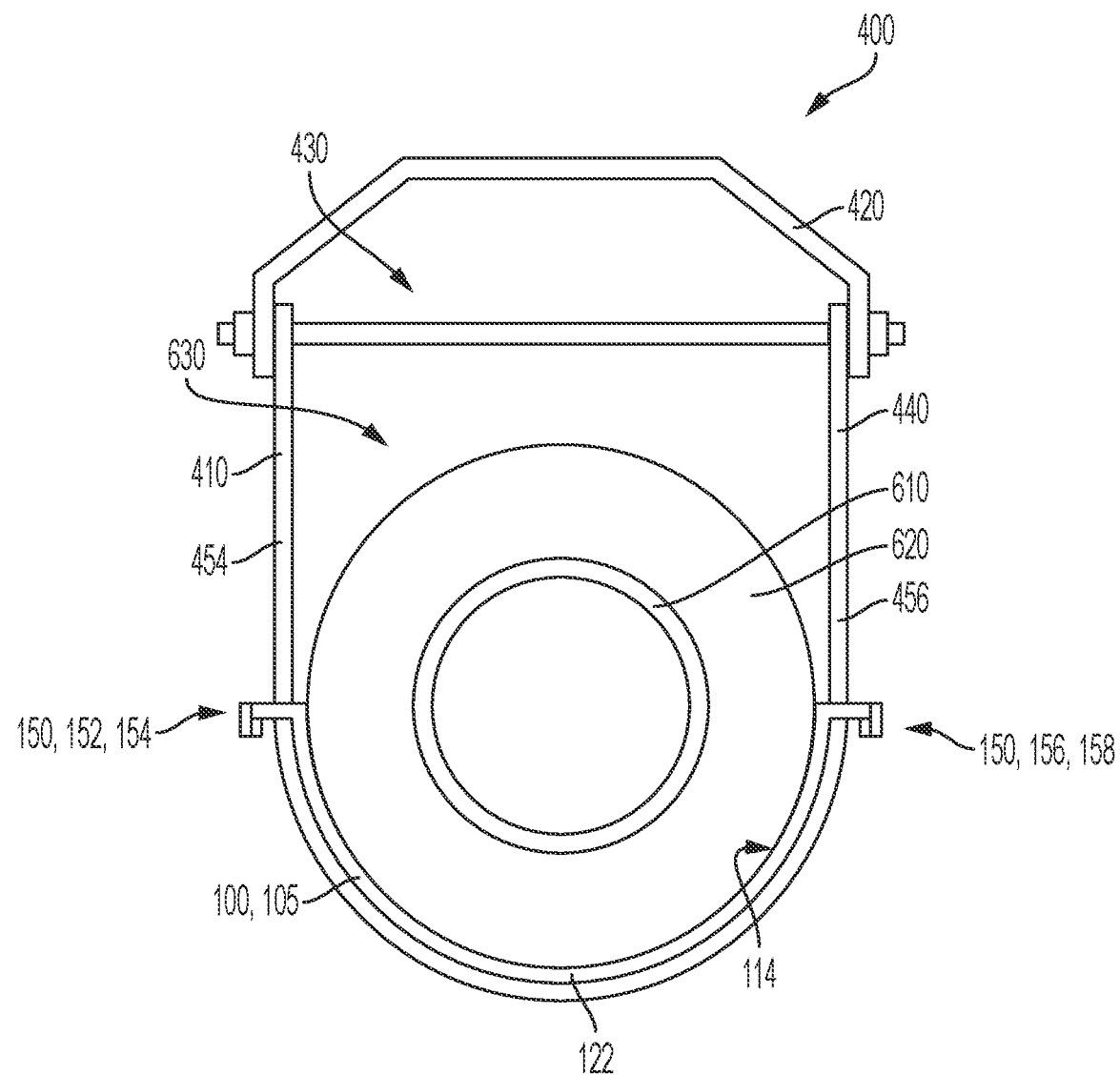
FIG. 6 illustrates a right side view of pipe support assembly supporting insulation and a pipe.

FIG. 6 illustrates a side view of the pipe support assembly 400 supporting the insulated pipe 630. The insulated pipe 630 can comprise the pipe 610 and the insulation 620. The pipe support assembly 400 can comprise the pipe hanger 410 and lockable pipe shield 100. In the present aspect, the lockable pipe shield 100 can be the lockable pipe insulation shield 105 configured to support insulation 620 along with the pipe 610. The pipe 610 can be part of a larger piping system configured to transport fluid therethrough. The fluid can be, for example, drinking water, waste water, gas, or the like. In the present aspect, the pipe 610 can be substantially encased in a cylindrical piece of the insulation 620. The insulation 620 can be, for example and without limitation, foam insulation or fiber glass insulation. The insulated pipe 630 can be cradled by the lockable pipe shield 100 and can be supported on the lower shield end 122 of the lockable pipe shield 100 with the insulation 620 confronting the inner shield surface 114. Furthermore, as shown, the first and second front lock tabs 152,154 of the lockable pipe shield 100 can be folded around the front hanger arm 454 and the first and second rear lock tabs 156,158 can be folded around the rear hanger arm 456 to secure the lockable pipe shield 100 to the pipe hanger 410. Thus, lateral movement of the lockable pipe shield 100, as well as the pipe 610 and insulation 620 supported thereon, can be prevented when the pipe support assembly 400 is subjected to vibrations, expansion and contraction cycles, and/or other movement. Furthermore, because the lock tabs 150 are folded away from the insulation 620 and are not located at the load-bearing lower shield end 122 of the lockable pipe shield 100, the lock tabs 150 will not interfere with and are prevented from damaging the insulation 620 and the pipe 610. Additionally, the rounded angles and corners of the cuts 210 (shown in FIG. 2) and the lock tabs 150 can prevent the lockable pipe shield 100 from nicking the insulation 620.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially con- That which is claimed is:

1. A lockable pipe shield for a pipe support assembly, the lockable pipe shield comprising:
a substantially curved shield body defining a first shield end, a second shield end opposite the first shield end, and an upper shield edge;
a first lock tab coupled to the shield body at the upper shield edge; and
a second lock tab coupled to the shield body at the upper shield edge;
wherein each of the first and second lock tabs are bendable relative to the shield body between a first position and a second position, wherein, in the first position, the lockable pipe shield is in an unlocked configuration, and in the second position, the lockable pipe shield is in a locked configuration and the second lock tab is folded over the first lock tab.

2. The lockable pipe shield of claim 1, wherein each of the first and second lock tabs defines an inner end and an outer end opposite the inner end, the inner end coupled to the shield body, the outer end being a free end, each of the first and second lock tabs comprising a hinge portion adjacent to the inner end and a tab portion adjacent to the outer end, the hinge portion configured to bend relative to the shield body.

3. The lockable pipe shield of claim 2, wherein the upper shield edge defines an upper boundary of each of the first and second lock tabs, and wherein a cut defines the outer end and a lower boundary of each of the first and second lock tabs.

4. The lockable pipe shield of claim 2, wherein the hinge portion defines a height that is less than a height of the tab portion.

5. The lockable pipe shield of claim 2, wherein the tab portion defines a tab opening therethrough, the tab opening configured to be engaged by a tool to push or pull each of the first and second lock tabs from the first position to the second position.

6. The lockable pipe shield of claim 1, wherein each of the first and second lock tabs defines at least one corner, the at least one corner being rounded.

7. The lockable pipe shield of claim 1, wherein the first lock tab is bendable towards the second lock tab and the second lock tab is bendable towards the first lock tab, and wherein a tab spacing is defined between the first lock tab and the second lock tab.

8. The lockable pipe shield of claim 7, wherein:
the upper shield edge is a front upper shield edge, the tab spacing is a front lock tab spacing, the first lock tab is a first front lock tab, and the second lock tab is a second front lock tab;
the lockable pipe shield further comprises a rear upper shield edge, a first rear lock tab monolithically formed with the shield body at the rear upper shield edge, and a second rear lock tab at the rear upper shield edge;
each of the first and second rear lock tabs are bendable relative to the shield body between the first position and the second position;
the first rear lock tab is bendable towards the second rear lock tab and the second rear lock tab is bendable towards the first rear lock tab; and
a rear lock tab spacing is defined between the first rear lock tab and the second rear lock tab.

9. The lockable pipe shield of claim 1, wherein:
the upper shield edge is a first upper shield edge;
the lockable pipe shield further comprises a second upper shield edge and a third lock tab at the second upper shield edge;
the first lock tab is configured to bend in a first direction relative to the shield body; and
the third lock tab is configured to bend in a second direction opposite the first direction relative to the shield body.

10. The lockable pipe shield of claim 1, wherein each of the first and second lock tabs are monolithically formed with the shield body.

11. A pipe support assembly comprising:
a pipe hanger defining a lower hanger end and a hanger arm, the hanger arm defining a side edge; and
a lockable pipe shield comprising a shield body and a lock tab, the shield body supported on the lower hanger end of the pipe hanger, the shield body defining an upper shield edge, wherein the upper shield edge defines a portion of the lock tab, the lock tab further defined by a cut extending into the shield body at the upper shield edge, the lock tab bendable around the side edge of the hanger arm to secure the lockable pipe shield to the pipe hanger;
wherein:
the lock tab is a first lock tab and a second lock tab is coupled to the shield body at the upper shield edge;
the side edge is a first side edge and the pipe hanger further defines a second side edge;
the second lock tab is bendable around the second side edge; and
the first lock tab overlaps the second lock tab.

12. The pipe support assembly of claim 11, wherein the lock tab defines an inner end coupled to the shield body, an outer end opposite the inner end, a hinge portion adjacent to the inner end, and a tab portion adjacent to the outer end, the hinge portion bendable relative to the shield body.

13. The pipe support assembly of claim 12, wherein the hinge portion defines a height that is less than a height of the tab portion.

14. The pipe support assembly of claim 12, wherein the upper shield edge defines an upper boundary of the lock tab, and wherein the cut defines the outer end and a lower boundary of the lock tab.

15. The pipe support assembly of claim 11, wherein:
The pipe hanger further comprises a second hanger arm defining a first side edge;
the lock tab is a first lock tab, the lockable pipe shield further comprising a second lock tab; and
the second lock tab is bendable around the first side edge of the second hanger arm.

16. The pipe support assembly of claim 11, wherein the lock tab is a first lock tab, the lockable pipe shield further comprising a second lock tab and a tab spacing extending between the first lock tab and the second lock tab, the second lock tab bendable around a second side edge of the hanger arm opposite the first side edge.

17. The pipe support assembly of claim 16, wherein:
the pipe hanger further comprises a second hanger arm, the second hanger arm defining a first side edge and a second side edge;
the lockable pipe shield further comprises a third lock tab, a fourth lock tab, and a second tab spacing extending between the third lock tab and the fourth lock tab;
the third lock tab is bendable around the first side edge of the second hanger arm; and
the fourth lock tab is bendable around the second side edge of the second hanger arm.

18. The pipe support assembly of claim 11, further comprising an insulated pipe supported on the shield body of the lockable pipe shield.

19. A method of securing a lockable pipe shield to a pipe hanger comprising:
supporting a lower shield end of the lockable pipe shield on a lower hanger end of the pipe hanger, the pipe hanger comprising a hanger arm defining a first side edge and a second side edge;
bending a first lock tab of the lockable pipe shield around the first side edge of the hanger arm, the lockable pipe shield defining an upper shield end distal to the lower shield end, the first lock tab adjacent to the upper shield end, wherein the upper shield edge defines a portion of the first lock tab, the first lock tab further defined by a first cut extending into the lockable pipe shield at the upper shield edge; and
bending a second lock tab of the lockable pipe shield around the second side edge of the hanger arm towards the first lock tab, the second lock tab adjacent to the upper shield end, wherein the upper shield edge defines a portion of the second lock tab, the second lock tab further defined by a second cut extending into the lockable pipe shield at the upper shield edge;
wherein the pipe hanger further comprises a second hanger arm defining a first side edge and a second side edge, the method further comprising bending a third lock tab of the lockable pipe shield around the first side edge of the second hanger arm and bending a fourth lock tab of the lockable pipe shield around the second side edge of the second hanger arm.

20. The method of claim 19, wherein:
bending the first lock tab of the lockable pipe shield around the first side edge of the hanger arm comprises bending a hinge portion of the first lock tab around the first side edge and disposing a tab portion of the first lock tab in confrontation with an outer surface of the hanger arm; and
bending the second lock tab of the lockable pipe shield around the second side edge of the hanger arm comprises bending a hinge portion of the second lock tab around the second side edge and disposing a tab portion of the second lock tab in confrontation with the tab portion of the first lock tab.

21. The method of claim 20, wherein:
bending the first lock tab further comprises engaging a tab opening of the tab portion of the first lock tab with a tool and pushing or pulling the tab portion of the first lock tab with the tool; and
bending the second lock tab further comprises engaging a tab opening of the tab portion of the second lock tab with the tool and pushing or pulling the tab portion of the second lock tab with the tool.

22. The method of claim 19, further comprising installing an insulated pipe with the lockable pipe shield, wherein the insulated pipe is supported by the lockable pipe shield.

23. The lockable pipe shield of claim 5, wherein the tab opening is oriented substantially perpendicular to the upper shield edge.

24. The lockable pipe shield of claim 11, wherein the cut extends into the shield body at the upper shield edge at a substantially perpendicular angle relative to the upper shield edge.

25. The lockable pipe shield of claim 24, wherein:
a first cut segment of the cut extends into the shield body at the upper shield edge at a substantially perpendicular angle relative to the upper shield edge; and
a second cut segment of the cut extends from the first cut segment distal to the upper shield edge, the second cut segment substantially parallel to the upper shield edge.

26. The method of claim 19, wherein bending the second lock tab of the lockable pipe shield around the second side edge of the hanger arm towards the first lock tab further comprises folding the second lock tab over the first lock tab.

27. A pipe support assembly comprising:
a pipe hanger defining a lower hanger end and a hanger arm, the hanger arm defining a side edge; and
a lockable pipe shield comprising a shield body and a lock tab, the shield body supported on the lower hanger end of the pipe hanger, the shield body defining an upper shield edge, wherein the upper shield edge defines a portion of the lock tab, the lock tab further defined by a cut extending into the shield body at the upper shield edge, the lock tab bendable around the side edge of the hanger arm to secure the lockable pipe shield to the pipe hanger;
wherein:
the lock tab is a first lock tab;
the lockable pipe shield further comprising a second lock tab and a tab spacing extending between the first lock tab and the second lock tab;
the second lock tab is bendable around a second side edge of the hanger arm opposite the first side edge;
the pipe hanger further comprises a second hanger arm, the second hanger arm defining a first side edge and a second side edge;
the lockable pipe shield further comprises a third lock tab, a fourth lock tab, and a second tab spacing extending between the third lock tab and the fourth lock tab;
the third lock tab is bendable around the first side edge of the second hanger arm; and
the fourth lock tab is bendable around the second side edge of the second hanger arm.

28. A method of securing a lockable pipe shield to a pipe hanger comprising:
supporting a lower shield end of the lockable pipe shield on a lower hanger end of the pipe hanger, the pipe hanger comprising a hanger arm defining a first side edge and a second side edge;
bending a first lock tab of the lockable pipe shield around the first side edge of the hanger arm, the lockable pipe shield defining an upper shield end distal to the lower shield end, the first lock tab adjacent to the upper shield end, wherein the upper shield edge defines a portion of the first lock tab, the first lock tab further defined by a first cut extending into the lockable pipe shield at the upper shield edge; and
bending a second lock tab of the lockable pipe shield around the second side edge of the hanger arm towards the first lock tab, the second lock tab adjacent to the upper shield end, wherein the upper shield edge defines a portion of the second lock tab, the second lock tab further defined by a second cut extending into the lockable pipe shield at the upper shield edge;

wherein bending the second lock tab of the lockable pipe shield around the second side edge of the hanger arm towards the first lock tab further comprises folding the second lock tab over the first lock tab.

\* \* \* \* \*